United States Patent
Kinkade, Jr.

(10) Patent No.: US 8,813,557 B2
(45) Date of Patent: Aug. 26, 2014

(54) DIESEL PARTICULATE FILTER FLOW RATE MEASURING APPARATUS AND METHOD

(75) Inventor: Charles E. Kinkade, Jr., Warren, MI (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 512 days.

(21) Appl. No.: 13/084,867

(22) Filed: Apr. 12, 2011

(65) Prior Publication Data

US 2012/0260727 A1    Oct. 18, 2012

(51) Int. Cl.
*G01F 1/68* (2006.01)

(52) U.S. Cl.
USPC .................................. 73/204.27; 73/204.11

(58) Field of Classification Search
USPC ................... 73/204.27, 204.23, 204.11, 861; 340/607, 606
See application file for complete search history.

(56) References Cited

U.S. PATENT DOCUMENTS

| | | | | |
|---|---|---|---|---|
| 4,304,129 A * | 12/1981 | Kawai et al. | ............... | 73/204.16 |
| 4,326,412 A * | 4/1982 | Kobayashi et al. | ......... | 73/204.27 |
| 4,897,096 A * | 1/1990 | Pischinger et al. | ............. | 55/283 |
| 5,869,758 A * | 2/1999 | Huiberts | ......................... | 73/197 |
| 6,941,750 B2 * | 9/2005 | Boretto et al. | .................. | 60/297 |
| 7,144,448 B2 * | 12/2006 | Garner et al. | ................... | 95/278 |
| 7,334,401 B2 * | 2/2008 | Cheng | ............................. | 60/297 |
| 2004/0055262 A1 * | 3/2004 | Zettel | ........................... | 55/282.3 |
| 2008/0087101 A1 * | 4/2008 | Konstandopoulos | ....... | 73/861.42 |
| 2009/0044514 A1 * | 2/2009 | Brahma et al. | .................. | 60/274 |

* cited by examiner

*Primary Examiner* — Lisa Caputo
*Assistant Examiner* — Roger Hernandez-Prewit
(74) *Attorney, Agent, or Firm* — Baker & Hostetler LLP

(57) ABSTRACT

A particulate filter is provided. The particulate filter includes: a plurality of sensors located in the filter; and a controller operatively connected to the sensors to determine a relative flow velocity over the sensors. A method for detecting obstructions in a filter may also be provided. The method may include: locating a sensor in a zone within a filter; connecting the sensor to a controller; monitoring the sensor with the controller; and determining whether the zone is obstructed based on data received from the sensor.

18 Claims, 7 Drawing Sheets

| | FLOW / AIR VELOCITY VARIANCE |
|---|---|
| 1 | ABOVE NORMAL - INCREASED FLOW COMPENSATING FOR DECREASED FLOW ZONES |
| 2 | ABOVE NORMAL - INCREASED FLOW COMPENSATING FOR DECREASED FLOW ZONES |
| 3 | ABOVE NORMAL - INCREASED FLOW COMPENSATING FOR DECREASED FLOW ZONES |
| 4 | ABOVE NORMAL - INCREASED FLOW COMPENSATING FOR DECREASED FLOW ZONES |
| 5 | ABOVE NORMAL - INCREASED FLOW COMPENSATING FOR DECREASED FLOW ZONES |
| 6 | DECREASED FLOW - 25% WITH ASH REMAINING |
| 7 | DECREASED FLOW - 25% WITH ASH REMAINING |
| 8 | DECREASED FLOW - 50% WITH ASH REMAINING |
| 9 | NORMAL - USED/CLEANED DPF |
| 10 | NORMAL - USED/CLEANED DPF |
| 11 | NORMAL - USED/CLEANED DPF |
| 12 | NORMAL - USED/CLEANED DPF |
| 13 | NORMAL - USED/CLEANED DPF |
| 14 | NORMAL - USED/CLEANED DPF |
| 15 | NORMAL - USED/CLEANED DPF |
| 16 | ABOVE NORMAL - INCREASED FLOW COMPENSATING FOR DECREASED FLOW ZONES |
| 17 | ABOVE NORMAL - INCREASED FLOW COMPENSATING FOR DECREASED FLOW ZONES |
| 18 | ABOVE NORMAL - INCREASED FLOW COMPENSATING FOR DECREASED FLOW ZONES |
| 19 | ABOVE NORMAL - INCREASED FLOW COMPENSATING FOR DECREASED FLOW ZONES |
| 20 | ABOVE NORMAL - INCREASED FLOW COMPENSATING FOR DECREASED FLOW ZONES |
| 21 | NORMAL - USED/CLEANED DPF |
| 22 | NORMAL - USED/CLEANED DPF |
| 23 | DECREASED FLOW - 50% WITH ASH REMAINING |
| 24 | LOW FLOW - HIGH ASH LEVELS IN AREA |
| 25 | NORMAL - USED/CLEANED DPF |

120

| | |
|---|---|
| TESTED FLOW: | 99% |
| TESTED FLOW VS. NEW: | 95.50% |
| CLEAN ZONES: | 10 |
| NORMAL ZONES: | 10 |
| ASH ZONES: | 2 |
| FAILED ZONES: | 3 |

*FIG. 6*

| 120 → | TIME (SEC) | TESTED DELTA TEMP | USED/CLEANED DPF DELTA TEMP | BASELINE NEW DPF DELTA TEMP |
|---|---|---|---|---|
| 1 | 60 | 6.1 | 5.3 | 5.5 |
| 2 | 60 | 6.2 | 5.3 | 5.5 |
| 3 | 60 | 6.3 | 5.3 | 5.5 |
| 4 | 60 | 6.1 | 5.3 | 5.5 |
| 5 | 60 | 6.3 | 5.3 | 5.5 |
| 6 | 60 | 4.3 | 5.3 | 5.5 |
| 7 | 60 | 4.2 | 5.3 | 5.5 |
| 8 | 60 | 3.1 | 5.3 | 5.5 |
| 9 | 60 | 5.3 | 5.3 | 5.5 |
| 10 | 60 | 5.3 | 5.3 | 5.5 |
| 11 | 60 | 5.3 | 5.3 | 5.5 |
| 12 | 60 | 5.3 | 5.3 | 5.5 |
| 13 | 60 | 5.2 | 5.3 | 5.5 |
| 14 | 60 | 5.2 | 5.3 | 5.5 |
| 15 | 60 | 5.2 | 5.3 | 5.5 |
| 16 | 60 | 6.1 | 5.3 | 5.5 |
| 17 | 60 | 6.1 | 5.3 | 5.5 |
| 18 | 60 | 6.1 | 5.3 | 5.5 |
| 19 | 60 | 6.1 | 5.3 | 5.5 |
| 20 | 60 | 6.1 | 5.3 | 5.5 |
| 21 | 60 | 5.5 | 5.3 | 5.5 |
| 22 | 60 | 5.2 | 5.3 | 5.5 |
| 23 | 60 | 3 | 5.3 | 5.5 |
| 24 | 60 | 2.3 | 5.3 | 5.5 |
| 25 | 60 | 5.5 | 5.3 | 5.5 |
| | TOTAL | 131.4 | 132.5 | 137.5 |

| TESTED FLOW: | 100 - 92% | 25 POINTS |
|---|---|---|
| | 91 - 88% | 18 POINTS |
| | 87 - 75% | 5 POINTS (TRIGGER FAIL) |
| | 74 - 0% | 0 POINTS (TRIGGER FAIL) |

| TESTED FLOW: | | ASH ZONES | FAILED ZONES |
|---|---|---|---|
| | 0 ZONES | 25 POINTS | 25 POINTS |
| | 1 ZONE | 23 POINTS | 20 POINTS |
| | 2 ZONES | 20 POINTS | 15 POINTS |
| | 3 ZONES | 18 POINTS | 10 POINTS |
| | 4 ZONES | 15 POINTS | 0 POINTS (TRIGGER FAIL) |
| | 5 ZONES | 10 POINTS | |
| | 6 ZONES | 0 POINTS (TRIGGER FAIL) | |

| TESTED FLOW: | 25 POINTS | 20 POINTS | 10 POINTS |
|---|---|---|---|
| | 55/75 POINTS | | |
| | 0.7333 | | |

| DPF IS 73% CLEAN |
|---|

FIG. 7

DIESEL PARTICULATE FILTER FLOW RATE MEASURING APPARATUS AND METHOD

FIELD OF THE INVENTION

The present invention relates generally to diesel particulate filters. More particularly, the present invention relates to a system and method for detecting clogs in specific areas in zones of a diesel particulate filter.

BACKGROUND OF THE INVENTION

Exhaust from engines such has diesel engines are filtered for particulate matter. A clogged filter can reduce the performance of the engine. Filters are often changed or cleaned based on a time frame measured in engine running time, miles driven or time as measured by the calendar. Such time intervals can result in clean filters being changed or cleaned and dirty as clogged filters remaining in service until the next time interval.

Accordingly, it is desirable to provide a method and apparatus that determines the actual condition of the filter.

SUMMARY OF THE INVENTION

The foregoing needs are met, to a great extent, by the present invention, wherein in one aspect an apparatus is provided that in some embodiments provides a method and apparatus for detecting whether a portion of a diesel particulate filter is clogged. In some embodiments, the system and apparatus can also detect which portions of a particulate filter are clogged. Further, in other embodiments the system and an apparatus can detect how badly various portions of the filter may be clogged.

In accordance with one embodiment of the present invention, a particulate filter is provided. The particulate filter includes: a plurality of sensors located in the filter; and a controller operatively connected to the sensors to determine a relative flow velocity over the sensors.

In accordance with another embodiment of the present invention, a method for detecting obstructions in a filter may also be provided. The method may include: locating a sensor in a zone within a filter; connecting the sensor to a controller; monitoring the sensor with the controller; and determining whether the zone is obstructed based on data received from the sensor.

In accordance with yet another embodiment of the present invention, a particulate filter may be provided. The particulate filter may include: a means for detecting a temperature at a plurality of locations in the filter; and a means for monitoring and controlling the means for detecting a temperature at a plurality of locations connected to the means for detecting a temperature at a plurality of locations to determine a relative flow velocity over the means for detecting a temperature at a plurality of locations.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a table showing the status of various zones of the filter as shown in FIG. 5.

FIG. 7 is a table showing the status of various zones of the filter shown in FIG. 5.

DETAILED DESCRIPTION

Figure 1:
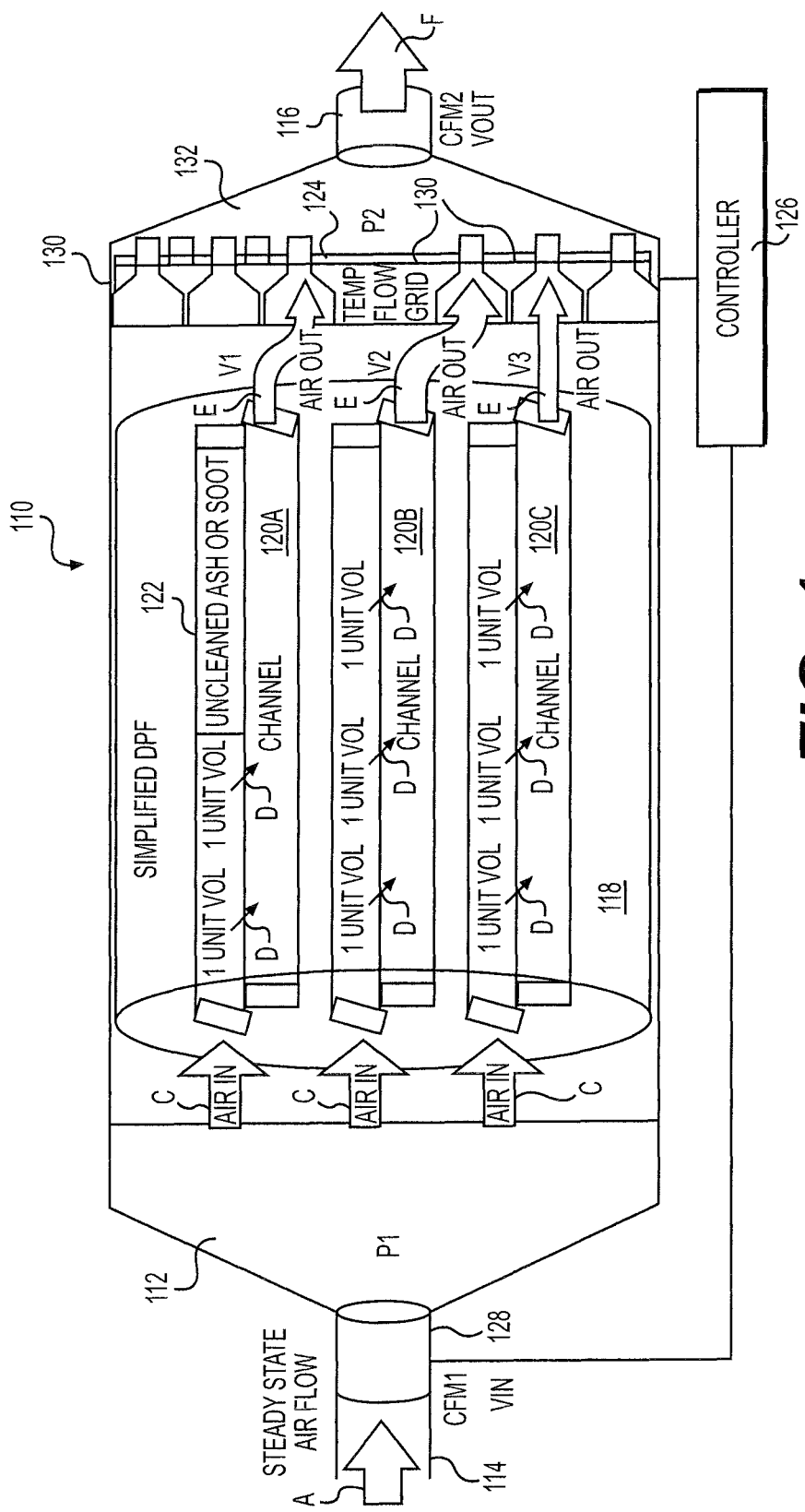
FIG. 1 is a schematic diagram of a diesel particulate filter and a controller in accordance with an embodiment of the invention.

The invention will now be described with reference to the drawing figures, in which like reference numerals refer to like parts throughout. An embodiment in accordance with the present invention provides a method and apparatus for detecting whether portions of a particular filter are clogged. Throughout this document the terms diesel particulate filter (DPF) and particulate filter are all used. It is intended that the principles discussed regarding the filter are not limited only to diesel particulate filters but can be applied to filters in general. Thus, the term diesel particulate filter or DPF is meant to be exemplarily rather than limiting.

FIG. 1 shows a filter assembly 110 in accordance with an embodiment of the invention. The filter assembly 110 is shown in schematic form and is not to scale. Several of the features may be enlarged for purposes of clarity. The filter assembly 110 includes a housing 112. On the left hand side of the filter assembly 110 is an inlet 114. As shown by arrow A, a fluid such as a gas to be filtered flows into the filter assembly 110 through the inlet 114 in the direction shown by arrow A. In some embodiments of the invention, the fluid may be exhaust gases from a diesel engine. However, other fluids may also flow into the filter in other applications.

Figure 4:
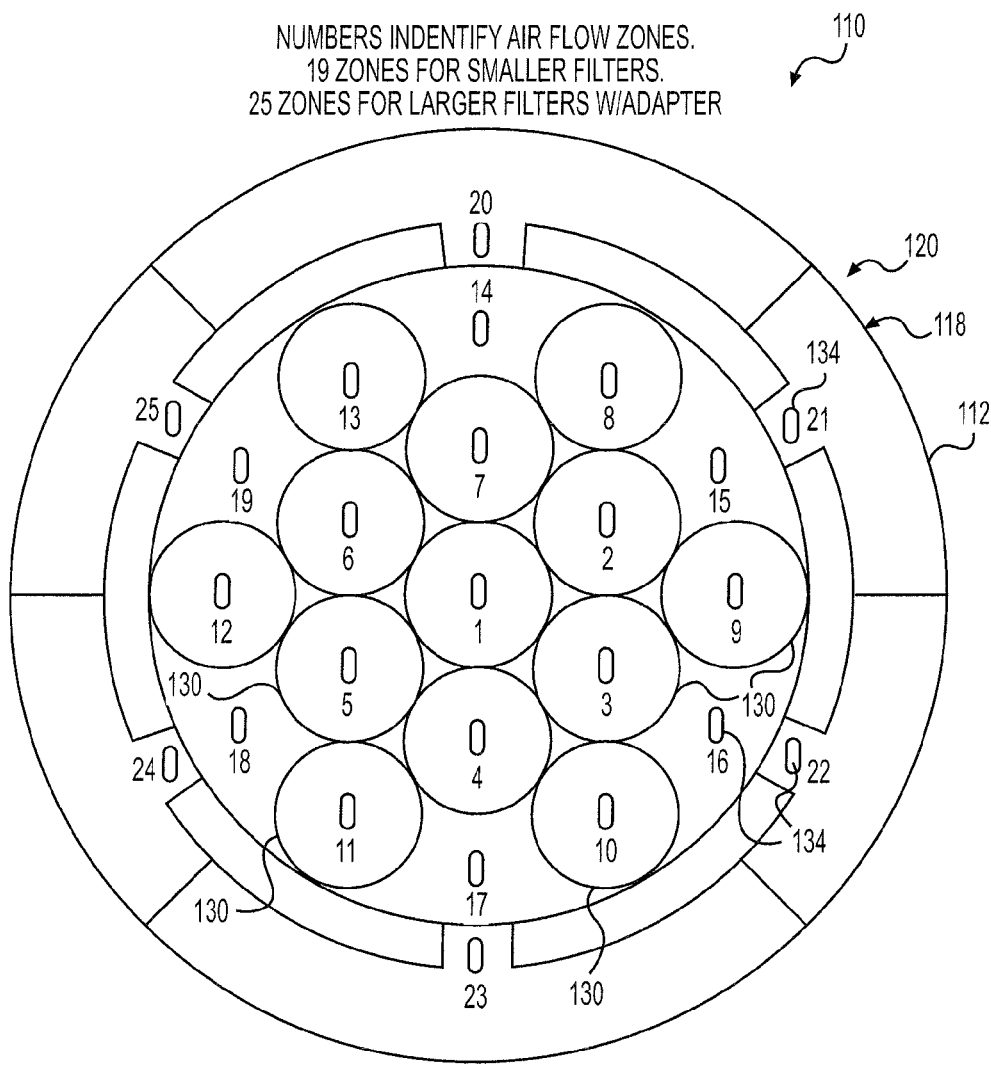
FIG. 4 is a cross-sectional view of a filter in accordance with an embodiment of the invention.
Figure 5:
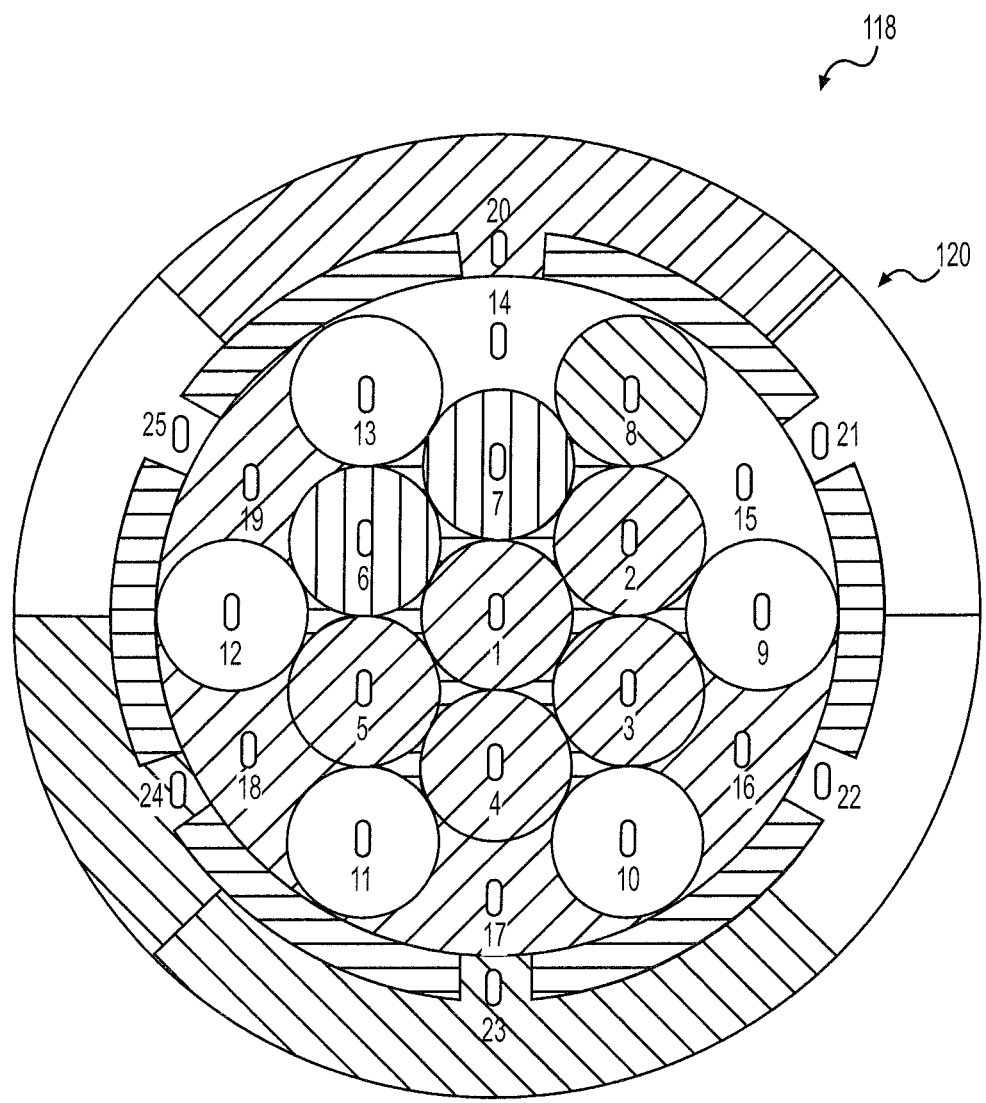
FIG. 5 is a cross-sectional view of a filter in accordance with an embodiment of the invention.

At the opposite end of the filter assembly 110 is an outlet 116. As shown by arrow F, fluid that has been filtered by flowing through the filter assembly 110 exits the filter assembly 110 via the outlet 116. Between the inlets 114 and 116 is the filter media 118. The filter media 118 is used to conduct the filtering function. The filter media 118 may be divided into multiple channels or zones 120. The zones will be identified by reference numeral 120, particular zones may be identified by a letter after the reference number 120, such as, 120*a*, 120*b*, 120*c* in FIG. 1. In FIGS. 4-6, the various zones are identified numerically by numbers 1-25.

A blockage 122 or clog in the filter media 118 is shown in zone 120*a*. The blockage 122 may be ash or soot or a combination of both. Blockages or clogs within the filter media 118 may also be comprised of any substance. The blockage 122 or clog in the filter media 118 shown in zone 120*a* is meant to be representative only. Blockages 122 can occur anywhere in the filter media 118. Furthermore, multiple blockages 122 can also exist within the same or within different zones 120 with the filter media 118.

A temperature flow grid 124 is an optional feature as shown in FIG. 1. Some embodiments of the invention the temperature flow grid 124 may be made of a mesh grid. The temperature flow grid 124 may be a metal grid such as wire or a screen that is used to provide support for sensors 134 (not shown in FIG. 1, but shown in FIGS. 2 and 3) which will be discussed in more detail further below.

Figure 2:
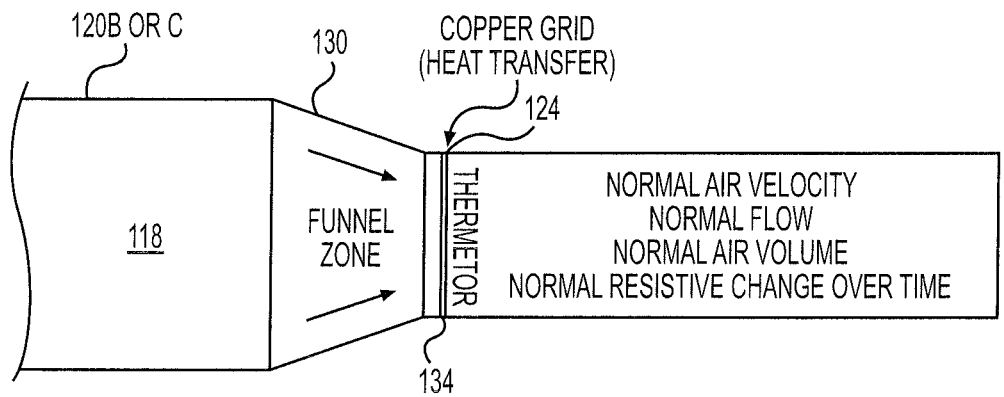
FIG. 2 is a partial side view of a portion of a particulate filter in accordance with an embodiment of the invention.
Figure 3:
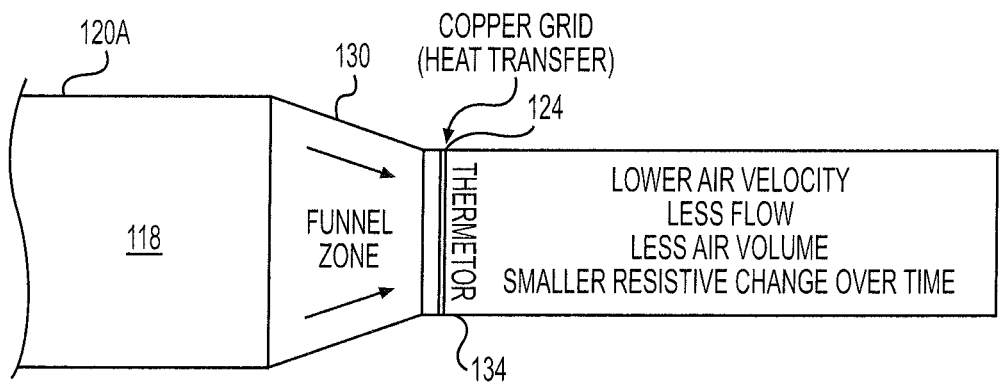
FIG. 3 is a partial side view of a portion of the filter in accordance with an embodiment of the filter.

The controller 126 may be operatively connected to the sensors 134 (as seen in FIGS. 2 and 3) which may be integrated with the grid 124. The controller 126 may be operatively connected to the optional heating element 128.

In embodiments of the invention where the heating element 128 is used, diesel exhaust fumes or other gases desired to be filtered enter into the inlet 114 as shown by arrow A. The gases may be heated to a desired temperature by the heating element 128. Gases continue to flow as shown by arrow C into various zones 120 within the filter media 118. The gases are free to move within the zones as shown by arrow D. For example, if the gases encounter an obstruction 122 as shown in zone 120*a*, the volume of gas will be moved through other channels 120 such as channels 120*b* and 120*c*.

The velocity of the gas flowing through channel A will be reduced due to the partial blockage 122. The velocity of the gas flowing through channel or zones 120*b* and 120*c* is increased as those channels are moving the gas directed from zone 120*a* in addition to the gas normally going through their zones. This increased velocity translates into increased flow through zones 120*b* and 120*c*.

Stated another way, the net diffusion rate of the gas across the membrane is proportional to the difference in pressure in the area of the membrane. Zone or channel 120*a* diffusion rate is essentially cut in half in the example scenario. This decreases the flow through channel 120*a* and usually does not create a increase in pressure in zone or channel A, however, the reason why pressure is not increased in Zone A is due to the diffusion rate of the gas moving through channels 120*b* and 120*c*, which increase flow and in turn increases velocity for those channels. Thus, by measuring the air velocity for multiple sections or zones of the diesel particulate filter 110, clogged and unclogged zones in the filter 118 may be determined. The lower the velocity in any particular zone indicates that the zone having lower velocity has an obstruction due to ash or soot and needs to be cleaned.

A high velocity is indictive of a non-clogged, free flowing zone. Monitoring of the flow of air or gas through the various zones may show different velocities between the zones. The higher the sensitivity of the sensors 134, the more accurate or better the result.

Typically, sensitive air flow measurements from multiple zones of a cylinder may be taken with sensors 134 such as, for example but not limited to, hot wire anemometers. Hot wire anemometers work such that air flow over the wire cools the exposed wire. The higher the flow, the cooler the wire. Thus, a cooler wire indicates a relatively higher velocity. The wire temperature can be monitored by the controller 126. Some drawbacks with hot wire anemometers are they may be expensive and delicate.

In accordance with the invention, thermistors can also be used based on a similar principle as hot wire anemometers. The thermistor may be more sensitive to temperature changes in the gas flow the thermistor is located in. A thermistor may be very sensitive and linear over small ranges and maybe durable and relatively inexpensive.

FIGS. 2 and 3 are partial views of the filter assembly 110 shown in FIG. 1. The various zones 120*a*, 120*b* or 120*c* are shown at the left of each Figure. Gas flows through the filter media 118 into the funnel zone 130 in the direction of the arrows indicated. The gas flows over the sensor 134 which is shown in FIGS. 2 and 3 as a thermistor, which may be part of a copper grid 124.

FIG. 2 shows flow through zones 120*b* and 120*c* which are not obstructed and thus have normal air velocity, air flow, air volume and normal resistive of change in the thermistor over time. An increase in the air velocity, air flow, air volume and normal resistive change in the thermistor over time would indicate that some other zone 120 filter assembly 110 may be blocked.

FIG. 3 shows the funnel zone 130 of the partially blocked zone 120*a*. Due to the partial blockage, there is lower air velocity, less volume, and less air flow and a small resistive change over time.

FIG. 4 is a cross-sectional view of the filter assembly 110. FIG. 4 is not intended to be to scale but shows zones having round cross sections and cross sections of other shapes. The zones in FIG. 4 are numbered 1-25. In some embodiments in accordance with the invention, the zones are of approximately equal cross-sectional area. In some embodiments the filter assembly has a thickness of approximately two inches.

The round areas shown in FIG. 4 are the funnel zones 130. A sensor 134 is associated with each of the zones 1-25. While not shown in FIG. 4, the sensors 134 may be connected or connected to a wire mesh grid 124. The mesh grid 124 may help transfer heat to the sensor 134 and help secure the sensor 134 in the center of the zone 120.

In some embodiments of the invention, the heater 128 is controlled by the controller 126 and is used to heat the air or gas entering the filter assembly 110. After an amount of time, the system will enter a steady state. In some embodiments of the invention a honeycomb air straightener, high beta or similar device may be placed up stream. The grid 124 of sensors 134 may be placed directly on the filter media 118 near the outlet 116 of the filter assembly 110. The controller 126 may monitor the temperature of each sensor 134 over time. A zone 120 that has a reduced flow due to a clog 122 blockage will show a slower rise in temperature over time and an ultimately lower temperature at the end of a test period.

In some embodiments of the invention, the baseline temperature could be room temperature. In some embodiments of the invention, other useful information may also be collected from the sensors 134 and the controller 126. For example, if it is assumed that soot absorbs more heat than ash, then zones or channels 120 of the filter media 118 that contains soot residue as opposed to ash residue may have a longer delay before a temperature rise begins and or a slower additional rise time if the temperature is monitored or graphed over time.

In other embodiments of the invention, the optional heating element 128 may not be used. In such embodiments, flow of air over the thermistor or sensor 134 would cause a negative temperature change due to heat dissipation. Thus, depending on the sensitivity of the result, no heat necessarily needs to be added to the system in order to determine the flow rate for each of the zones 120.

FIG. 5 is an illustration similar to that shown in FIG. 4 having multiple zones or channels 120 in the filter media 118. The multiple zones or channels 120 are numbered 1-25. Different hatching schemes are associated with the various channels 120 and can be compared to the hatching scheme shown in the chart shown in FIG. 6. The chart in FIG. 6 shows an associated detected condition of its channel 120. The numbers on the left column correspond to the zone or channel 120 numbers 1-25.

FIG. 7 is also a chart that is associated with the filter media 118 shown in FIG. 5. Various zones 1-25 have been monitored for sixty seconds and various data has been collected. In the example test illustrated and shown in FIGS. 5-7 a point system has been assigned with weighted results depending on the results of the test. In the example test, the overall average flow of the filter assembly 110 was normal. Taking into account the clean zones which increased airflow and the failed zones which largely diminished airflow, the overall airflow balance out. The failed and ash zones where taken into account via a separate point total.

FIG. 7 illustrates the various points assigned to the different zones resulting in the point total. The conclusion of the example test shows that the overall flow of the filter was acceptable and that the ash and soot content in the filter media 118 is taken into account to determine that the filter media is only 73% clean. This result could be calculated by the controller 126 in some embodiments of the invention or by user in other embodiments. One of ordinary skill in the art would appreciate the various percentages of blockages could be considered acceptable, not acceptable for various situations. The percentages which would place the filter into the acceptable, non-acceptable or imminent range may be determined on an individual basis.

Figure 8:
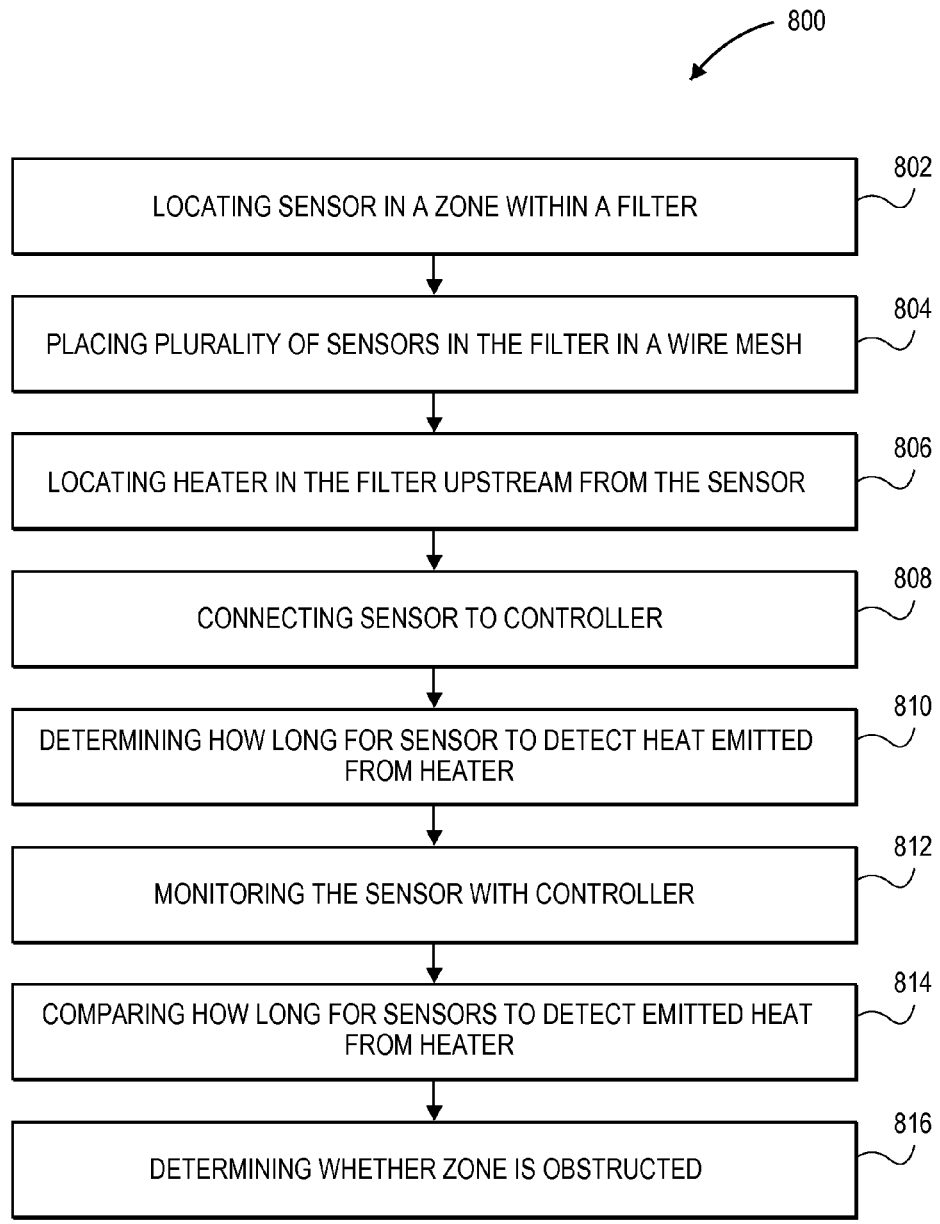
FIG. 8 shows a method for detecting an obstruction accordance with an embodiment of the invention.

FIG. 8 shows a method 800 for detecting an obstruction accordance with an embodiment of the invention. The method is not limited to any order and all steps don't need to be performed. At step 802, locating a sensor in a zone within a filter. At step 804, placing a plurality of sensors in the filter in a wire mesh. At step 806 locating a heater in the filter upstream from the sensor. At step 808, connecting the sensor to a controller. At step 810, determining how long it takes for the sensor to detect heat emitted from the heater. At step 812, monitoring the sensor with the controller. At step 814, comparing how long it takes for sensors in the filter to detect heat emitted from the heater. At step 816, determining whether the zone is obstructed based on data received from the sensor.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A particulate filter comprising:
    a plurality of sensors located in a filter media; and
    a controller operatively connected to the plurality of sensors to determine a relative flow velocity over the plurality of sensors, wherein the controller is configured to determine a rate of temperature change for a sensor of the plurality of sensors and determines that the sensor is located in a clogged zone if the rate of temperature change varies from a threshold range.

2. The particulate filter of claim 1, wherein the plurality of sensors detect a temperature and the controller is configured to determine the relative flow velocity over the plurality of sensors based on temperatures detected by plurality of the sensors.

3. The particulate filter of claim 2, wherein the plurality of sensors are one of a hot wire anemometer and a thermistor.

4. The particulate filter of claim 2, wherein the particulate filter is divided into flow zones and plurality of sensors are configured to detect a temperature associated with gas flowing through each flow zone.

5. The particulate filter of claim, 1, further comprising a mesh grid distributed across the filter media and the plurality of sensors are connected to the mesh grid.

6. The particulate filter of claim 1, further comprising a heater located proximate to an intake of the filter media, the heater configured to heat gas flowing into the filter media.

7. The particulate filter of claim 6, wherein the heater is operatively connected to the controller and the controller compares how long it takes for the various plurality of sensors to detect heat emitted by the heater.

8. The particulate filter of claim 7, wherein the controller determines that sensors of the plurality of sensors that exceed a length of time to detect the heat emitted by the heater are located in a clogged zone.

9. The particulate filter of claim 1, further comprising a funnel configured to funnel a gas flowing through the filter media to flow over one of the plurality of sensors.

10. A method for detecting obstructions in a filter comprising:
    locating a first sensor in a zone within a filter media;
    connecting the first sensor to a controller;
    monitoring the sensor with the controller; and
    determining whether the zone is obstructed based on data received from the first sensor, wherein the controller determines a first rate of temperature change that is detected by the sensor and compares the detected first rate of temperature change with a second detected rate of temperature change from a second sensor in the filter.

11. The method of claim 10, wherein the first and second sensors measure a temperature in the zone.

12. The method of claim 10, wherein the controller determines the zone is obstructed if the detected first rate of temperature change is below a threshold amount.

13. The method of claim 10, further comprising locating a heater in the filter upstream from the first sensor.

14. The method of claim 13, further comprising determining how long it takes for the first sensor to detect heat emitted from the heater.

15. The method of claim 13, further comprising comparing how long it takes for the first and second sensors in the filter media to detect heat emitted from the heater.

16. The method of claim 10, wherein the first and second sensors are one of a hot wire anemometer and a thermistor.

17. The method of claim 10, further comprising placing a plurality of sensors in the filter media in a wire mesh.

18. A particulate filter comprising:
    means for detecting a temperature at a plurality of locations in a filter media; and
    means for monitoring and controlling the means for detecting a temperature configured to determine a relative flow velocity over the means for detecting a temperature at a plurality of locations.

* * * * *